April 4, 1961 J. B. TOPP 2,978,239
APPARATUS FOR TREATING GRANULATED BULK MATERIAL
Filed Nov. 5, 1958
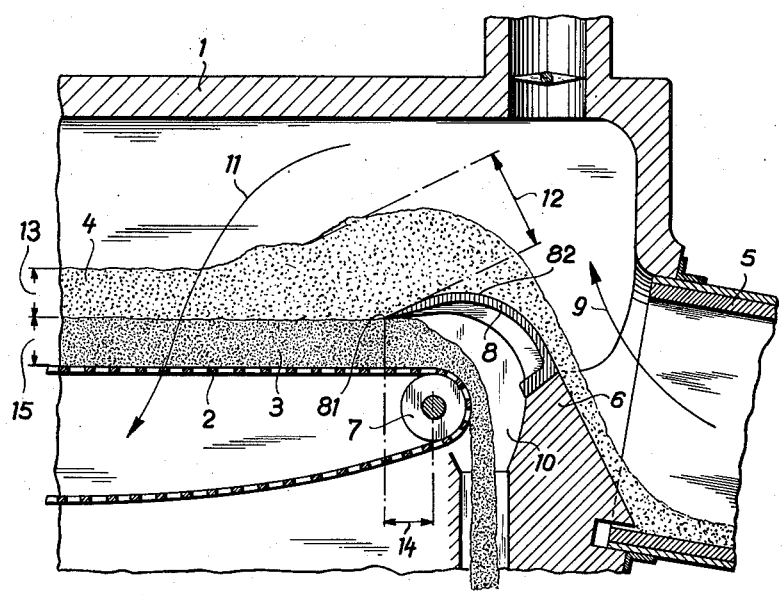
INVENTOR United States Patent Office 2,978,239
Patented Apr. 4, 1961

2,978,239
APPARATUS FOR TREATING GRANULATED BULK MATERIAL

Johann Bernhard Topp, Braunschweig, Germany, assignor to Miag Muhlenbau und Industrie G.m.b.H., Braunschweig, Germany, a German corporation Filed Nov. 5, 1958, Ser. No. 772,064

Claims priority, application Germany Nov. 9, 1957

1 Claim. (Cl. 263—32)

This invention is concerned with apparatus for treating granulated bulk material transported for processing relative to a kiln on a screening conveyor carrying upon a layer of fresh granules a layer of granulated material which passes on the conveyor for a second time through the kiln, the material layers being traversed by downwardly directed gases, and the two material layers being separated at the end of the conveyor by the edge of a separator for the purpose of controlling the feeding thereof into the main kiln, for example, into a rotary kiln.

In prior structures of this general type, a great part of the recirculated material layer is drawn under the separator edge due to the crumbling away of the fresh granules at the conveyor discharge end near the kiln and also due to the suction draft prevailing thereat. The operations to be performed on the screening conveyor are thus considerably disturbed because the recirculated material is repeatedly cycled, the main kiln is not sufficiently supplied, and the necessary thickness of the recirculated layer is not maintained.

The invention overcomes these drawbacks by particularly forming and disposing the separator and the cutting or separating edge thereof so as to effect damming up of the recirculated material layer near and at the discharge end of the screening conveyor. The thickness of the corresponding dammed up portion of the recirculated material layer may be twice the thickness of the portion thereof that is not dammed up.

This object is realized by the provision of an arcuate upwardly curving separator the material cutting or separating edge of which is disposed at a point, ahead of the axis of the conveyor sprockets at the discharge end thereof, by a distance, as seen in the conveyor travel direction, which corresponds substantially to the thickness of the fresh granular layer.

The various objects and features of the invention will appear from the description of an example thereof which is rendered below with reference to the accompanying drawing.

The screening conveyor 2 is disposed in a housing 1 and carries layer 3 of fresh granules upon which is disposed layer 4 of recirculated material which had been spread thereon. Between the chute 6, through which the sufficiently pre-treated material is fed into the inlet 5 of a rotary kiln, and the discharge end of the screening conveyor 2 at the reversing sprockets 7 thereof is disposed the separator blade 8 forming an edge disposed so as to effect the separation of the two material layers 3 and 4. In order to prevent the gas coming from the main kiln along a path indicated by arrow 9 from flowing around the edge of the separator blade 8 and tearing off parts of the pre-treated, recirculated layer 4, for discharge into the chute 10 together with fresh material granules of layer 3, the recirculated layer 4 is dammed up along an area directly ahead of the conveyor discharge end, that is, ahead of the axis of the reversing sprockets 7, the thickness 12 of the dammed up material amounting to about twice the normal thickness 13 of the recirculated layer 4, thereby preventing the gas from flowing around the edge of the separator blade 8 and compelling the gas to traverse and to flow through the layers and the carrier flight of the screening conveyor in the direction indicated by arrow 11, and thus avoiding the previously explained undesired operational effects.

The separator or blade 8 is upwardly curved, presenting to the material the convex arcuate surface 82 for guiding the material of the recirculated layer 4 so as to effect the damming up thereof, the leading or material cutting and separating edge 81 being disposed ahead of the axis of the reversing sprockets 7 by an amount 14 which corresponds approximately to the thickness 15 of the fresh material layer 3.

Both layers 3 and 4 have substantially the same thickness (13, 15) and may reach a total height of at least 10 inches; this means that, due to the uniform treatment of the top layer 4, the length of the screening conveyor carrying the two layers may be less than half the length of known conveyors carrying only one layer, and that the total thickness of the layers may amount to twice the thickness of a layer processed individually on a screening conveyor. In other words, the corresponding double layer heat exchanger works with layer thicknesses up to 20 inches and more, while until now layer thicknesses of about 8 inches were practically the utmost that could be handled.

The screening conveyor may be formed of individual plates, perforated if desired, which are pivotally linked to the corresponding conveyor chains, accordingly flapping down along the lower return path of the conveyor travel. At the start of the return path, crossbars may be provided (not shown) upon which the screening conveyor plates fall when flapping down. The plates are in this manner shaken and throw off granular particles adhering to the perforations thereof, thus providing an automatic cleaning effect. The spacing between the screening conveyor plates may amount at most to about 5 mm., and the metal bars extending between the plates may be dimensioned similarly.

Changes may be made within the scope and spirit of the appended claim.

I claim:

Apparatus for treating granulated bulk material, comprising an elongated housing, inclined chute means at one end of said housing, a rotary kiln having an inlet connected with said housing and said inclined chute means, intermediate discharge means ahead of said inclined chute means, an endless conveyor in said housing terminating ahead of said chute means and said intermediate discharge means, said conveyor adapted for moving a bed of granulated bulk material in the direction of said chute means, said bed of granulated bulk material comprising a bottom layer of fresh granules and a top layer of pre-treated granules, gases from said kiln flowing through said inlet into said housing along said top layer and through such top layer and said bottom layer to effect heat exchange treatment of the granules forming such layers, and a device adapted for separating said layers to effect transport of the treated material of said top layer along said chute means and through said inlet into said kiln and to effect transport of the treated material of said bottom layer into said intermediate discharge, said device comprising a convex arcuate separating member extending from said chute means into said housing and having a cutting edge lying above said conveyor ahead of the point of termination of said conveyor by an amount adapted to be equal at least to the thickness of said bottom layer and positioned in a horizontal plane extending below the apex of the curvature of said member, said cutting edge adapted for biting into said bed of granulated bulk material along a plane coinciding substantially with the line of demarcation between said top layer and said bottom layer with the convex portion of said separating member adjacent said cutting edge being inclined upwardly operative to restrict flow of the material of said top layer whereby such material is caused to dam up along an area near to and at the point of termination of said conveyor thereby preventing flow around said cutting edge of the incoming gases from the kiln and compelling transport of the material of the top layer over said separating member and along said chute means into said inlet of said kiln while causing the material of said bottom layer to flow from said conveyor into said intermediate discharge.

References Cited in the file of this patent

UNITED STATES PATENTS

| | | |
|---|---|---|
| 1,322,652 | Testrup | Nov. 25, 1919 |
| 1,555,116 | Haber | Sept. 29, 1925 |
| 1,919,054 | Cope et al. | July 18, 1933 |
| 2,466,601 | Lellep | Apr. 5, 1949 |
| 2,879,983 | Sylvest | Mar. 31, 1959 |

FOREIGN PATENTS

| | | |
|---|---|---|
| 182,325 | Switzerland | Apr. 16, 1936 |